Patented Mar. 11, 1930

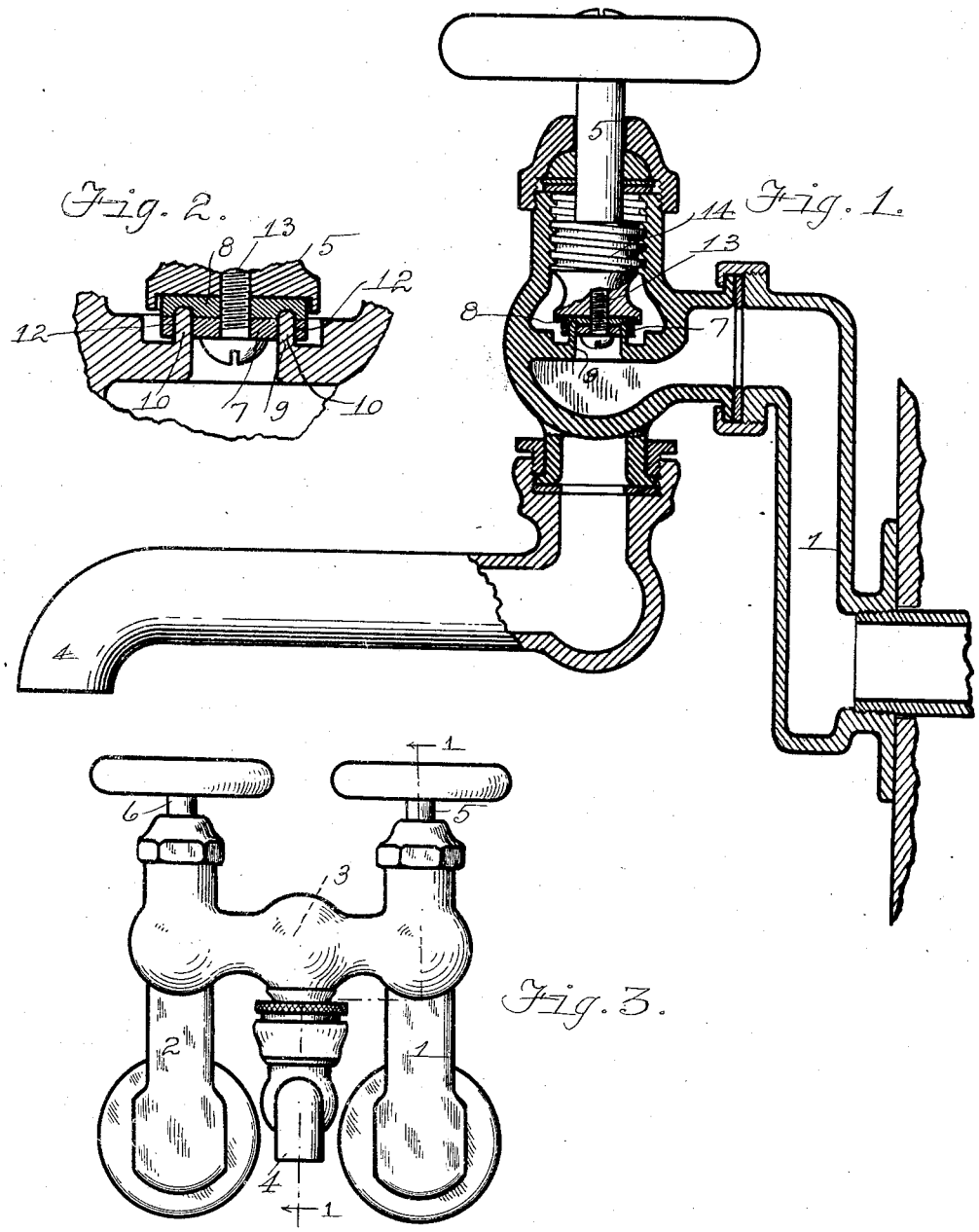

1,750,462

UNITED STATES PATENT OFFICE

LOUIS A. CORNELIUS, OF GRAND RAPIDS, MICHIGAN, ASSIGNOR TO WOLVERINE BRASS WORKS, OF GRAND RAPIDS, MICHIGAN, A CORPORATION OF MICHIGAN

VALVE

Application filed January 13, 1926. Serial No. 80,923.

The present invention relates to valves; and its object is to provide a seating member for valves which shall be durable to a marked degree; and further, to provide such a member which shall contact the valve's seat to very effectively close the valve; and further, to provide such a member which shall resist to a marked degree the disintegrating action of heat and cold.

These and any other objects hereinafter appearing are attained by, and the invention finds preferable embodiment in, the valve structure hereinafter particularly described in the body of this specification and illustrated by the accompanying drawings, in which:

Figure 1 is a sectional view of a faucet structure taken on vertical planes corresponding to line 1—1 of Figure 3;

Figure 2 is a sectional view of portions of the same taken on the same line; and Figure 3 is a front view of the faucet structure.

In the embodiment of the invention illustrated by the accompanying drawings, a bath tub faucet is shown having a hot water supplying pipe 1, a cold water supplying pipe 2, a hot and cold water mixing chamber 3 and a discharge nozzle 4 leading therefrom. A valve having a threaded valve stem 5 controls the admission of hot water into said chamber, a valve having a valve stem 6 controlling the admission of cold water thereinto. Each of these valve stems carries at its lower end a packing washer or seating member comprising two layers or strata 7, 8 of elastic material, disposed parallelly with the valve seat 9, one of said strata being softer than the other. This seating member may be formed of rubber discs securely cemented or vulcanized together to prevent the admission of water or sediment therebetween. The valve seat, as shown, has an annular rib 10 extending upwardly toward the valve.

It is well known that valve washers made of soft rubber, while fairly durable when used in a cold water line and although capable of more perfectly contacting a valve seat, are soon disintegrated and destroyed in a hot water line; and that, if such washers are hard enough to withstand such disintegrating action in hot water, they are too hard to perfectly seat the valve. My washer or seating member, composed as it is of relatively hard and soft strata or layers, obviates to a good degree this objection, and especially where the water admitted into the mixing chamber of such a valve as that illustrated may be hot or cold. My valve washer or seating member is applied to the valve stem with its softer side or stratum 7 downward (as indicated in Figures 1 and 2) i. e., nearer to the valve seat. The washer or seating member as shown in Figure 2 has a groove 12 forming an annular opening through its softer layer or stratum 7 so that the upper edge of the valve seat's annular rib 10 contacts the harder layer or stratum 8. Thus, the superior valve-seating capability of my seating member is attained because the sides of the rib 10 contact with the sides of the annular groove 12 or opening through the softer stratum 7, in a manner much more effective for closing the valve than if the upper edge of said rib abutted on the harder stratum 8 without the provision of the soft stratum 7 through which the groove 12 extends to receive the annular rib.

In order to minimize the abrasion of the seating member by the valve seat or its rib 10, this seating member is mounted rotatively on the valve stem by the screw 13 passing through an orifice in the center of said member and threaded in the valve stem. By this provision, the valve may be screwed down by its threads 14 without turning the seating member on the valve seat.

The invention being intended to be pointed out in the claims, is not to be limited to or by details of construction of the particular embodiment thereof illustrated by the drawings or hereinbefore described.

I claim:

1. In a device of the character described: a valve seat; a valve having a member carried thereby comprising a stratum of elastic material adjacent the valve stem and adapted to contact the extremity of the valve seat, and a stratum of elastic material softer than the first-mentioned stratum and adapted to contact the side of the valve seat in the valve's seated position.

2. In a device of the character described: a valve seat having an annular rib extending toward the hereinafter-mentioned valve; a valve having a valve stem and a seating member carried thereby comprising a stratum of elastic material and a stratum of elastic material softer than the first-mentioned stratum and united thereto, the first-mentioned stratum being adapted to contact the edge of said rib in the valve's seated position, and the second-mentioned stratum having an annular opening therethrough adapted to receive said rib in contacting relation with the opposite sides thereof in the valve's seated position.

In testimony whereof I have hereunto set my hand at Grand Rapids, Michigan, this 8th day of January, 1926.

LOUIS A. CORNELIUS.